United States Patent

Sulkin

[11] Patent Number: 5,390,498
[45] Date of Patent: Feb. 21, 1995

[54] FUEL DISTRIBUTION ASSEMBLY
[75] Inventor: David A. Sulkin, Ipswich, Mass.
[73] Assignee: General Electric Company, Cincinnati, Ohio
[21] Appl. No.: 196,728
[22] Filed: Feb. 15, 1994
[51] Int. Cl.⁶ ............................................. F02C 7/232
[52] U.S. Cl. ........................................ 60/739; 60/261
[58] Field of Search ................ 60/734, 739, 261, 740, 60/741

[56] References Cited

U.S. PATENT DOCUMENTS

| | | | |
|---|---|---|---|
| 2,969,925 | 1/1961 | Burgess et al. | 239/453 |
| 2,978,870 | 4/1961 | Vdouiak | 60/39.74 |
| 3,002,353 | 10/1961 | McEneny | 60/39.74 |
| 3,595,021 | 7/1971 | Tissier | 60/243 |
| 3,750,396 | 8/1973 | Tucker | 60/39.74 R |
| 3,775,975 | 12/1973 | Stenger et al. | 60/39.32 |
| 3,793,838 | 2/1974 | Nash | 60/261 |
| 3,827,638 | 8/1974 | Halvorsen | 60/739 |
| 4,010,767 | 3/1977 | Cornell | 137/118 |
| 4,239,053 | 12/1980 | Cornell | 137/110 |
| 4,370,854 | 2/1983 | Williams | 60/261 |
| 4,402,184 | 9/1983 | Faulkner et al. | 60/739 |

Primary Examiner—Louis J. Casaregola
Attorney, Agent, or Firm—Jerome C. Squillaro; David L. Narciso

[57] ABSTRACT

A gas turbine engine fuel distribution assembly includes a fuel manifold having a fuel distribution channel therein, and a plurality of fuel distribution valves disposed inside the manifold. Each valve is disposed in the manifold for providing a bypass channel therearound for allowing unobstructed flow of the fuel through the distribution channel in turn to each of the valves. Each valve has an inlet disposed in flow communication with the distribution channel for receiving a portion of the fuel therefrom, and an outlet extending laterally through the manifold for providing controlled fuel flow therefrom.

10 Claims, 3 Drawing Sheets

FUEL DISTRIBUTION ASSEMBLY

The U.S. Government has rights in this invention in accordance with Contract No. N00019-92-C-0149 awarded by the Department of Navy.

The present invention relates generally to aircraft gas turbine engines, and, more specifically, to a fuel distribution assembly for providing fuel to a combustor or augmenter therein.

BACKGROUND OF THE INVENTION

An aircraft gas turbine engine includes a main combustor for generating combustion gases for propelling an aircraft in flight. Military gas turbine engines typically also include an augmenter or afterburner which is a secondary combustor at the aft end of the engine for providing additional thrust when desired. In the main combustor as well as the augmenter, fuel is typically channeled thereto through a plurality of circumferentially spaced apart fuel injectors or spraybars which receive metered fuel from common manifolds circumferentially surrounding the combustors.

In the augmenter, for example, the circumferentially spaced apart fuel injectors include those ranging in elevation from the bottom of the engine to the top which therefore introduces pressure variations in the fuel channeled thereto due to gravity which is typically referred to as differences in hydraulic pressure head. Fuel at the bottom of the engine has a higher pressure head which therefore will result in an uneven fuel distribution circumferentially around the engine unless suitable distribution valves are provided. Various fuel distribution assemblies are known in the art for accommodating the differential pressure head, which assemblies vary in complexity, space requirements, and weight all of which are significant factors in the design of an aircraft engine. The common manifold typically provides fuel through pigtail fuel lines to individual distribution valves typically mounted to an outer casing of the engine, with respective fuel injectors being mounted to the valves. The combustor environment such as that found in an augmenter is relatively hot which typically requires expensive high temperature materials and suitable cooling provisions for ensuring an effective life of the fuel distribution assembly.

These fuel systems, therefore, typically require a substantial number of parts which must be accurately manufactured and joined together in spite of manufacturing stackup tolerances. Since the valves are subjected to relatively high temperatures, the typical springs found therein are subject to high temperature spring relaxation which can shift the flow controlling effect of the valve unless suitably compensated for.

SUMMARY OF THE INVENTION

A gas turbine engine fuel distribution assembly includes a fuel manifold having a fuel distribution channel therein, and a plurality of fuel distribution valves disposed inside the manifold. Each valve is disposed in the manifold for providing a bypass channel therearound for allowing unobstructed flow of the fuel through the distribution channel in turn to each of the valves. Each valve has an inlet disposed in flow communication with the distribution channel for receiving a portion of the fuel therefrom, and an outlet extending laterally through the manifold for providing controlled fuel flow therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
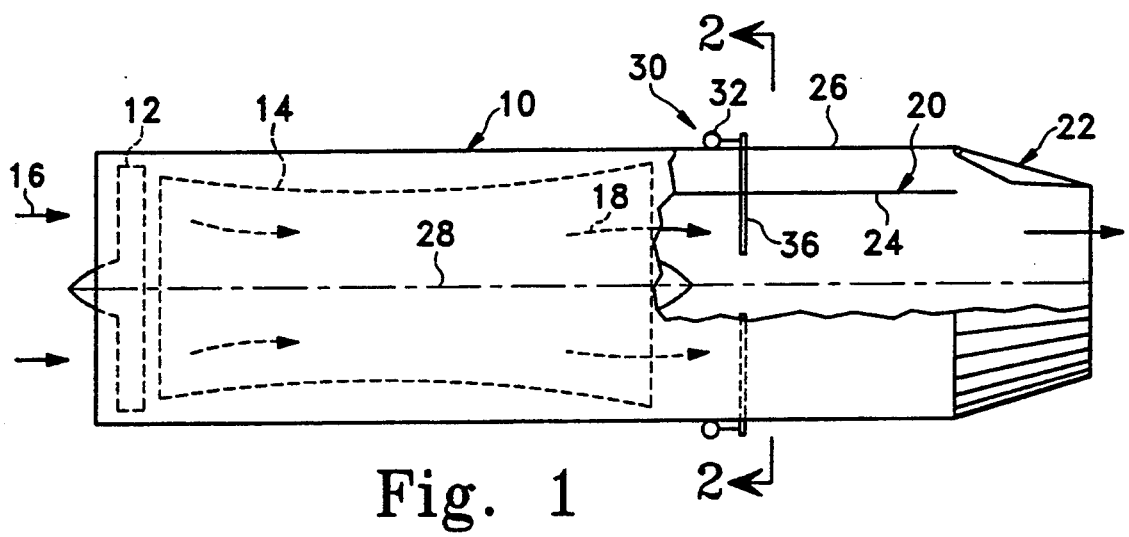
FIG. 1 is a schematic, partly sectional longitudinal view of an exemplary augmented gas turbine engine having a fuel distribution assembly in accordance with one embodiment of the present invention.

Illustrated schematically in FIG. 1 is an exemplary augmented gas turbine engine 10 which includes a conventional fan 12 powered by a core engine 14 both shown in phantom. The core engine 14 is also conventional and includes a compressor, combustor, and one or more turbine stages for powering the fan 12 as is conventionally known. Ambient air 16 is received by the engine 10, compressed therein and mixed with fuel and ignited for generating combustion gases 18 which are used by the turbines to power the fan 12 and which are discharged to an augmenter or afterburner 20 prior to discharge from the engine 10 through a conventional variable area exhaust nozzle 22.

The augmenter 20 includes a conventional annular combustion liner 24 disposed radially inwardly of a conventional annular outer casing 26 and coaxially therewith about an axial centerline axis 28 of the engine.

Figure 2:
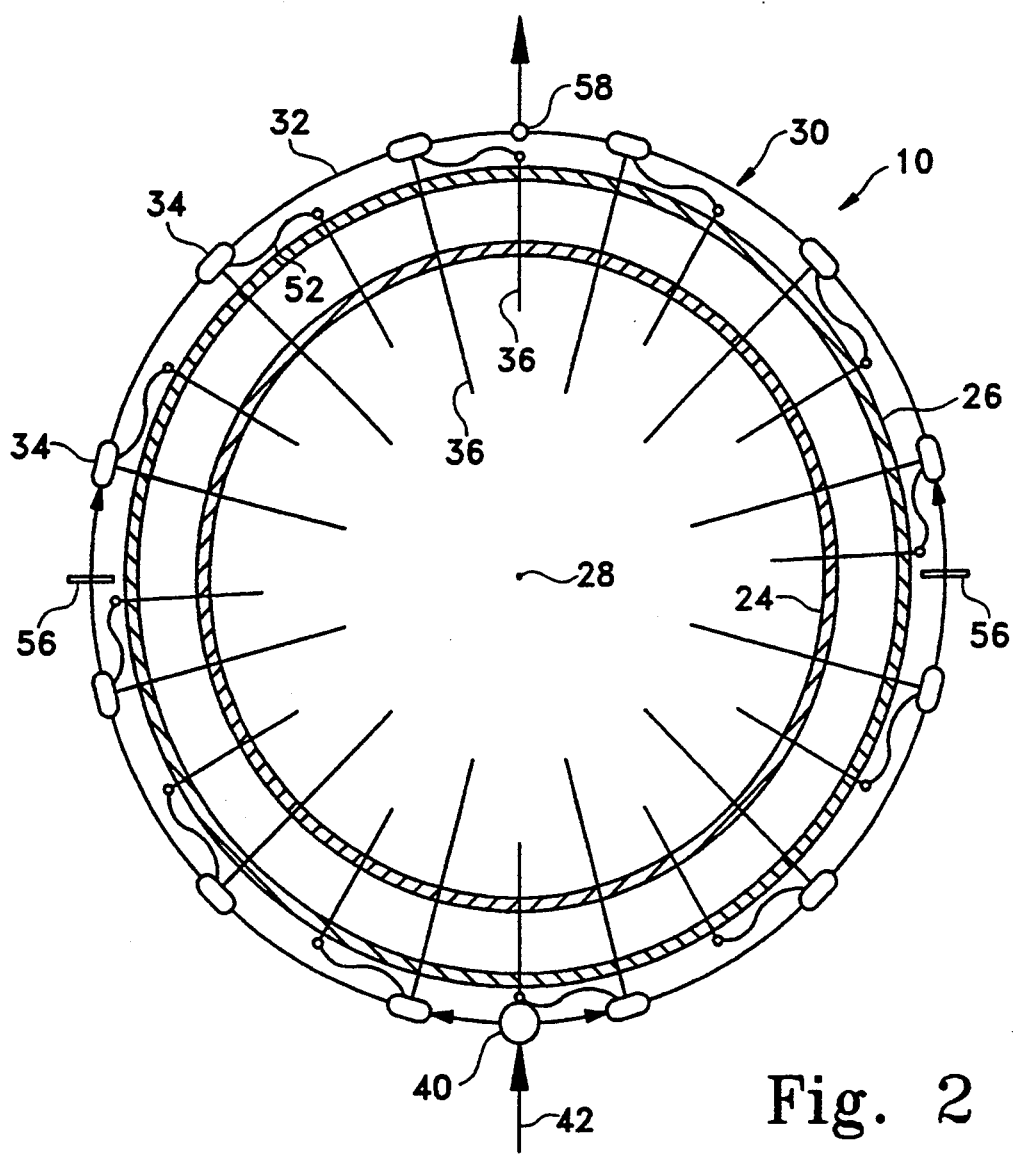
FIG. 2 is a radial sectional view through the augmenter of the engine illustrated in FIG. 1 and taken along line 2—2 which schematically illustrates the fuel distribution assembly in accordance with one embodiment of the present invention.

The augmenter 20 is conventional except for a fuel distribution assembly 30 shown schematically in FIGS. 1 and 2 in an exemplary embodiment of the present invention. The assembly 30 includes an arcuate or annular fuel manifold 32 in the form of a tubular pipe extending circumferentially around the outer casing 26 and coaxially with the centerline axis 28. A plurality of fuel distribution valves 34 are disposed inside the manifold 32 and circumferentially spaced apart from each other. A plurality of conventional, circumferentially spaced apart fuel injector spraybars 36 extend radially through the outer casing 26 and the combustor liner 24, and are disposed in flow communication with respective ones of the valves 34 for channeling fuel into the combustion liner 24 when desired for providing additional thrust from the engine 10 in a conventional manner.

Figure 3:
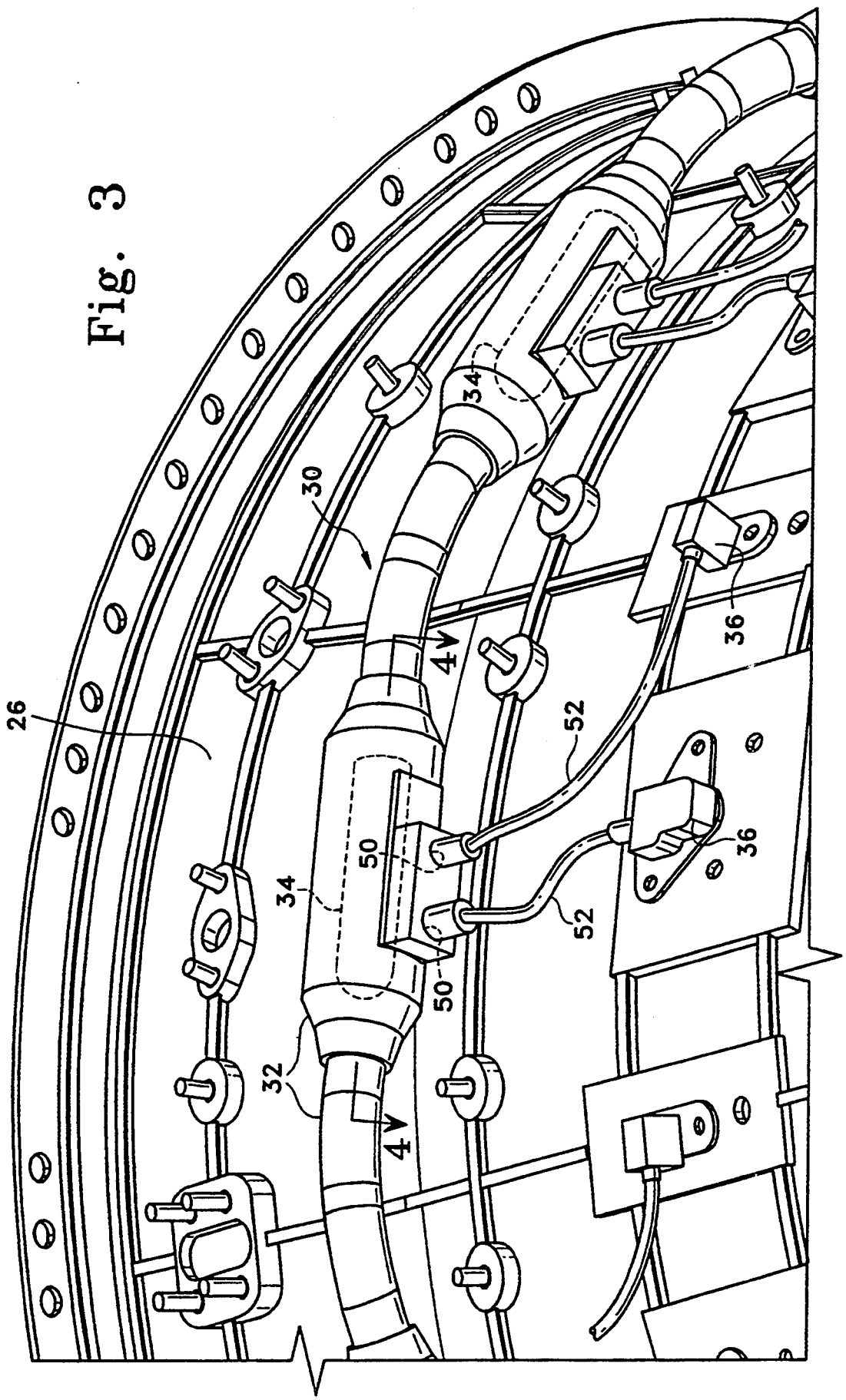
FIG. 3 is a perspective view of a portion of the fuel distribution assembly illustrated in FIGS. 1 and 2 including an annular manifold having serially joined fuel distribution valves therein mounted to an outer casing for providing fuel to a plurality of fuel injector spraybars.

A portion of the fuel distribution assembly 30 is illustrated in more particularity in FIG. 3 which shows the outer casing 26 disposed radially inwardly of the manifold 32 and coaxially therewith. The manifold 32 is conventionally supported by the outer casing 26.

Figure 4:
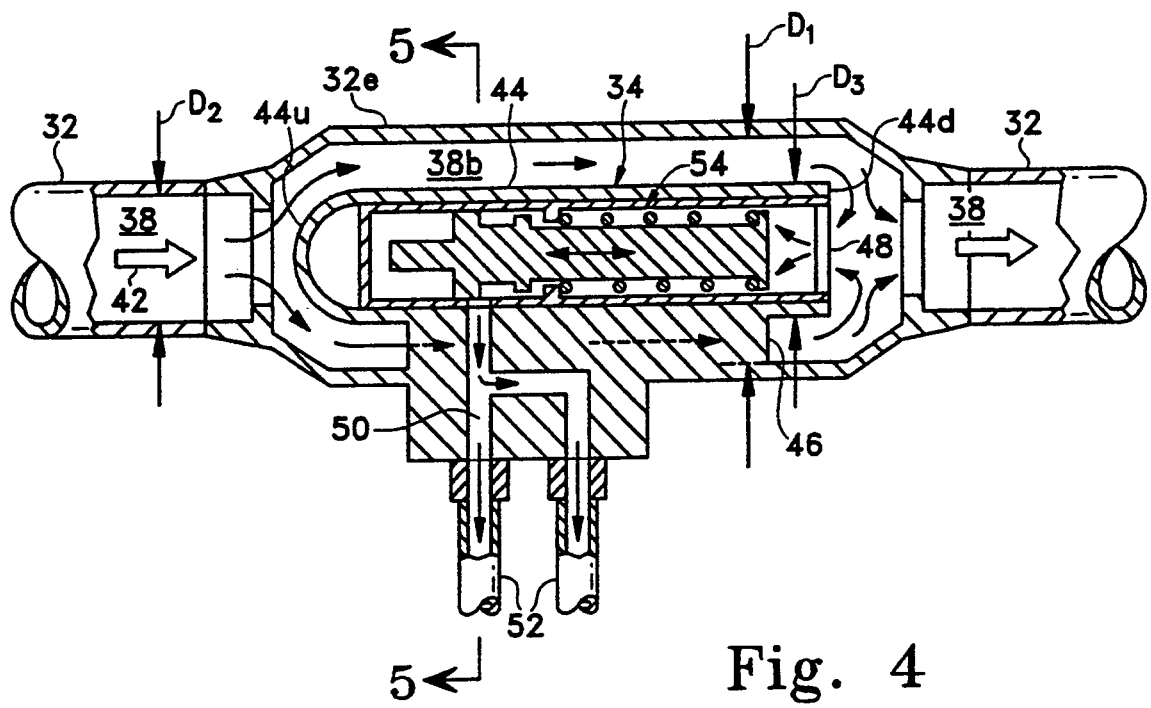
FIG. 4 is an axial sectional view of an exemplary one of the fuel distribution valves disposed in an portion of the manifold illustrated in FIG. 3 and taken along line 4—4.

Referring to both FIGS. 3 and 4, the combined manifold 32 and valves 34 in accordance with one embodiment of the present invention is illustrated in more particularity. As shown in FIG. 4, the manifold 32 has a central fuel distribution channel 38 defined by the radially inner or inside surface of the manifold 32 for channeling fuel circumferentially therethrough. As shown in FIG. 2, the manifold 32 has an inlet 40 preferably disposed at the bottom thereof for receiving fuel 42 from a conventional fuel supply (not shown) for flow through the distribution channel 38 of the manifold 32.

As shown in FIG. 4, each of the valves 34 is sized for providing a bypass channel 38b therearound for allowing substantially unobstructed flow of the fuel 42 through the distribution channel 38 in serial flow and in turn to each of the valves 34 around the circumference of the manifold 32. Since each of the valves 34 is directly incorporated or combined directly into the manifold 32, the configuration of the manifold 32 is adjusted to encompass the valves 34 therein without undesirable blockage therefrom.

Figure 5:
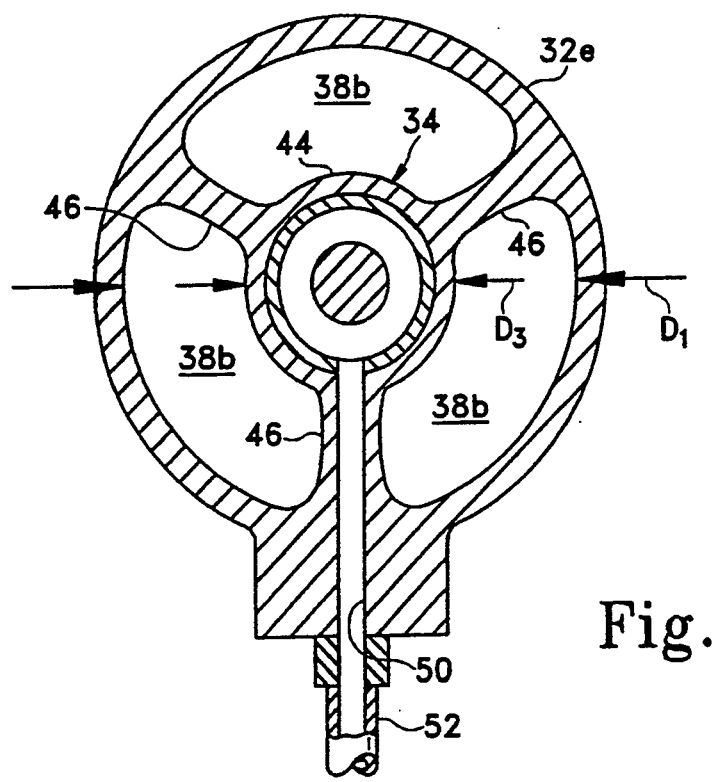
FIG. 5 is a radial sectional view through the valve and manifold portion illustrated in FIG. 4 and taken along line 5—5.

More specifically, as shown in FIGS. 4 and 5, each of the valves 34 includes a tubular housing 44 disposed in the distribution channel 38, concentrically within the manifold 32 and spaced radially inwardly therein to define the concentric bypass channel 38b radially between the housing 44 and the inner wall of the manifold 32. At least one strut 46, and as shown in FIG. 5 three struts 46 extend radially between the housing 44 and the manifold 32 and are fixedly joined thereto for fixedly mounting the housing inside the manifold 32. The three struts 46 used in the embodiment illustrated in FIG. 5 are preferably equiangularly spaced apart from each other for supporting the valve housing 44 inside the enlarged portion of the manifold 32e. Accordingly, the struts 46 bifurcate the distribution channel 38 into three respective bypass channels 38b defined circumferentially between adjacent ones of the struts 46. The housing 44, struts 46, and respective portion of the manifold 32 may be a common one-piece casting for example.

As shown in FIGS. 4 and 5, the manifold 32 has an enlarged portion 32e surrounding each of the valves 34 with an inner diameter $D_1$ which is larger adjacent each of the valves 34 than the nominal inner diameter $D_2$ of the manifold 32 between adjacent ones of the valves 34 for providing substantially equal flow area circumferentially through the manifold 32 from a first one of the valves 34 to a last one of the valves 34, which, for example, is from the bottom to the top valves 34 illustrated in FIG. 2. The flow area of the manifold 32 between adjacent valves 34 is merely a circular flow area whereas the flow area in the enlarged manifold portion 32e adjacent each of the valves 34 is the annulus defining the bypass channel 38b between the inner diameter $D_1$ of the enlarged manifold portion 32e and the outer diameter $D_3$ of the valve housing 44 minus the cross-sectional area of the three struts 46. Accordingly, the manifold 32 may be made as small as required for carrying the required volume of fuel between the adjacent valves 34 and suitably enlarged as required for allowing a suitable quantity of the fuel 42 to bypass an individual one of the valves 34 for flow to the valves 34 downstream therefrom.

The manifold 32 may be conventionally formed in parts with the smaller diameter nominal portions thereof being suitably joined to the enlarged portions 32e thereof. The joints may be brazed or welded, or threaded, or bolted as desired. Since each manifold enlarged portion 32e may be manufactured as an individual component, the valve cartridge 54 may be readily inserted into the housing 44 from the opening at the downstream end thereof. If required during a maintenance operation, the enlarged manifold portion 32e may be suitably disconnected from the adjacent downstream portion therefrom for obtaining access to the housing 44 for removal and replacement of the cartridge 54 if required.

Referring again to FIG. 4, each of the valve housings 44 is preferably elongate and has an upstream end 44u and an opposite downstream end 44d relative to the fuel flow through the manifold 32. Each valve 34 includes an inlet 48 preferably disposed in the housing downstream end 44d in flow communication with the distribution channel 38 for receiving a portion of the fuel therefrom. Each valve 34 also includes an outlet 50 extending radially from the housing 44, through one of the struts 46 and laterally through the wall of the manifold 32 for discharging the fuel portion from the valve 34. The valve outlet 50 is suitably joined to one or more conventional fuel lines 52 which in turn are joined to respective ones of the spraybars 36 as illustrated in FIG. 3 for example.

As shown in FIG. 4, each of the valves 34 preferably includes a removable valve cartridge 54 slidably disposed inside the housing 44 for operatively controlling fuel flow from the valve inlet 48 to the valve outlet 50. The specific structure of the valve cartridge 54 may take any conventional form for controlling fuel flow therethrough such as the spool valve illustrated, or a poppet valve for example. The valve cartridge 54 illustrated in FIG. 4 has a conventional slidable central valve member suitably biased closed by a conventional compression spring. When the pressure of the fuel 42 reaches a predetermined level, the valve opens to allow fuel flow through the outlet 50 and to its respective spraybar 36 in a conventionally known manner.

The combined manifold 32 and valves 34 disclosed above provide many advantages. For example, since the valve 34 itself is disposed inside the manifold 32 and directly receives fuel 42 therefrom, conventional pigtail fuel lines typically used in the prior art for joining together separated manifolds and valves are not required. The resulting space requirement for the manifold 32 and integral valves 34 is therefore reduced, with fewer parts and a reduction in weight.

Most importantly, the valves 34 are directly immersed in the fuel 42 and are therefore cooled thereby. Whereas conventional, separate valves in the prior art are separately mounted to the outer casing 26 and therefore subject to heating therefrom, the valves 34 disposed inside the manifold 32 are inherently cooled. This improves the ability of the assembly 30 for passing conventional fire test requirements since the valves 34 are constantly bathed in the circulating fuel for cooling. The so cooled valves 34 also reduce temperature-induced relaxation of the spring in the valve cartridge 54 reducing flow shifts in the operation of the valve 34.

Since conventional, separate valves typically include bends in the fuel flow between the manifold and the valve, undesirable pressure drops therefrom are created. Such pressure drops are necessarily eliminated by combining the valve 34 directly into the manifold 32 as disclosed above. In the preferred embodiment illustrated in FIG. 4, each of the valve inlets 48 is disposed at the housing downstream end 44 in a radial plane coaxially with the manifold distribution channel 38 and faces in a downstream direction. In this way, the fuel 42 initially flows over the upstream end 44u of the housing 44, through the bypass channels 38b and then must turn 180° in the upstream direction to enter the valve inlet 48. Accordingly, the fuel 42 at the valve inlet 48 experiences static pressure for driving it through the valve 34. Since the main flow of the fuel 42 continues past the housing downstream end 44d and through the manifold 32 to the next adjacent valve 34, particles or debris carried in the fuel 42 will flow with the main fuel 42, with particle separation due to centrifugal force being effected for providing cleaner fuel flow into the valve inlets 48. In this embodiment, the housing upstream end 44u is suitably streamlined for reducing pressure losses therefrom, and may simply have the hemispherical configuration illustrated in FIG. 4. In an alternate embodiment of the invention not illustrated, the inlet 48 may be instead disposed in the housing upstream end 44u instead of its downstream end 44d for receiving the fuel 42 under dynamic pressure if desired.

Referring again to FIG. 2, the manifold 32 is arcuate and extends at least in part circumferentially relative to the centerline axis 28, and as shown is fully annular and extends 360°. The manifold 32 may be formed of two 180° top and bottom halves suitably joined together at horizontal flanges 56 if desired. The manifold inlet 40 is disposed at the bottom thereof in this exemplary embodiment, and the manifold 32 further includes an outlet 58 at a top thereof. The manifold outlet 58 is suitably connected to the fuel supply for providing recirculation flowpath so that fuel may be constantly channeled through the manifold 32 for cooling the manifold 32 and the valves 34 disposed therein. The valves 34 are preferably circumferentially spaced apart from each other at substantially equal angles, although other configurations may be used as desired. In the exemplary embodiment illustrated in FIGS. 2-4, the outlet 50 for each of the valves 34 splits in two to provide two paths to two respective fuel spraybars 36. Other arrangements as desired may also be utilized.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A gas turbine engine fuel distribution assembly comprising:
    a fuel manifold having a central fuel distribution channel therein and an inlet for receiving fuel for flow through said distribution channel; and
    a plurality of fuel distribution valves disposed inside said manifold and spaced apart from each other, each of said valves:
        including a housing spaced radially inwardly in said manifold for providing a bypass channel therearound for allowing substantially unobstructed flow of said fuel through said distribution channel in turn to each of said valves;
        having an inlet disposed in said housing in flow communication with said distribution channel for receiving a portion of said fuel therefrom, and an outlet extending laterally through said manifold; and
        being operable for controlling flow of said fuel portion through said valve from said valve inlet to said valve outlet.

2. An assembly according to claim 1 wherein said housing is tubular and is disposed in said distribution channel concentrically within said manifold and spaced radially inwardly therein to define said bypass channel radially between said housing and said manifold; and each of said valves further comprises:
    at least one strut extending radially between said housing and said manifold and fixedly joined thereto for fixedly mounting said housing inside said manifold; and
    said valve outlet extends radially from said housing and through said strut and said manifold for discharging said fuel portion from said valve.

3. An assembly according to claim 2 further comprising a plurality of said struts equiangularly spaced apart from each other for supporting said valve housing inside said manifold, and a plurality of said bypass channels defined between adjacent ones of said struts.

4. An assembly according to claim 2 wherein each of said valves further comprises a removable valve cartridge disposed inside said valve housing for operatively controlling fuel flow from said valve inlet to said valve outlet.

5. An assembly according to claim 2 wherein each of said valve housings is elongate having an upstream end and an opposite downstream end, and said valve inlet is disposed in said downstream end.

6. An assembly according to claim 5 wherein each of said valve inlets is disposed in a radial plane coaxially with said distribution channel, and faces downstream.

7. An assembly according to claim 2 wherein:
    said manifold is arcuate and extends at least in part circumferentially relative to a centerline axial axis;
    said valves are circumferentially spaced apart from each other; and
    said manifold inlet is disposed at a bottom of said manifold.

8. An assembly according to claim 7 further comprising:
    an annular outer casing disposed radially inwardly of said manifold and coaxially therewith;
    an annular combustion liner spaced radially inwardly of said outer casing and coaxially therewith; and
    a plurality of fuel injector spraybars extending radially through said outer casing and said combustion liner, and disposed in flow communication with respective ones of said valve outlets for channeling fuel into said combustion liner.

9. An assembly according to claim 8 wherein said manifold further includes an outlet at a top thereof for allowing continuous flow of said fuel through said manifold.

10. An assembly according to claim 9 wherein said manifold has a larger inner diameter adjacent each of said valves than between adjacent ones of said valves for providing substantially equal flow area circumferentially through said manifold from a first one of said valves to a last one of said valves.

* * * * *